Patented Jan. 10, 1950

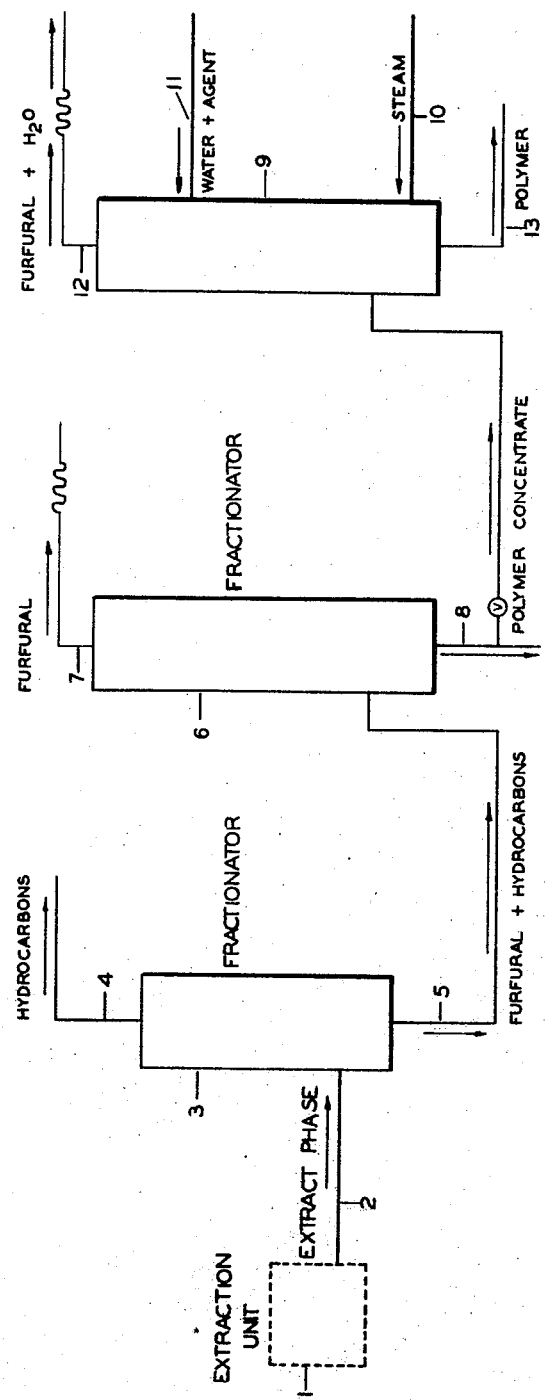

2,494,325

UNITED STATES PATENT OFFICE 2,494,325

RECOVERY OF FURFURAL FROM FURFURAL-POLYMER MIXTURES

Charles T. Anné and Roy F. Nelson, Port Arthur, Tex., assignors to The Texas Company, New York, N. Y., a corporation of Delaware Application March 14, 1945, Serial No. 582,766

4 Claims. (Cl. 202—57)

This invention relates to the recovery of furfural from mixtures of furfural and polymer such as produced in the extraction and extractive distillation of hydrocarbon mixtures containing olefins and diolefins with furfural.

The invention contemplates recovering furfural from such mixtures by distillation with the aid of steam in the presence of a small amount of a surface active agent, advantageously an agent which is soluble in or miscible with water. An effective agent is one which has at least the surface active properties of sodium naphthenate. It is employed in sufficient amount to prevent polymer from accumulating on the interior surfaces of the distilling apparatus.

Furfural is a useful solvent for effecting fractional separation between olefinic and paraffin hydrocarbons and also for effecting separation between olefins differing in degree of unsaturation. Thus, it may be used for effecting separation between mono-olefins and diolefins.

It has been found that when furfural is used to extract unsaturates such as butadiene from hydrocarbon mixtures the furfural becomes contaminated during continued use with a small but appreciable amount of polymer or resin material. It appears that furfural under the conditions employed during the extractive treatment or during its recovery from the hydrocarbons undergoes polymerization to a small extent, or may enter into reaction with olefinic hydrocarbons forming polymer material, or both of these reactions may take place. Also, the unsaturated hydrocarbons may undergo polymerization in the presence of the furfural.

The presence of this polymer material in the mixture of hydrocarbons and furfural is objectionable because it forms deposits within the plant apparatus and particularly the distillation, heat exchange and other apparatus used for recovering the furfural. It tends to stick to the metal surfaces and as a result during continued exposure to elevated temperatures is converted into solid carbonaceous form. The deposition of this material upon the surfaces of the heat exchangers interferes with their efficient operation and in addition results in the necessity for frequent cleaning of the apparatus. This deposition may be so serious as to cause a shutdown of the plant.

Thus, the function of the surface-active agent is to prevent the polymer material from accumulating upon the interior surfaces of the apparatus during steam distillation and particularly during the recovery of furfural from mixtures containing a relatively high proportion of the polymer material. The prevention of accumulation of polymer material on the metal surfaces is possibly due to the wetting action of the agent or to its ability to maintain the polymer material dispersed during the distillation.

It has been found that sodium naphthenate and sodium resinate are effective agents for this purpose. They are advantageously employed in the form of aqueous solutions containing about 0.1 to not in excess of about 1% by weight of the agent. Other agents may be employed as mentioned later.

In actual plant operation wherein it is desired to extract butadiene from a $C_4$ hydrocarbon mixture by extraction or extractive distillation, the hydrocarbon mixture is subjected to contact with furfural at temperatures in the range about 140 to 340° F. so as to produce an extract phase comprising furfural and dissolved butadiene. This extract phase is separately subjected to distillation, advantageously in the absence of steam, so as to strip the hydrocarbons from the solvent at temperatures in the range about 280 to 340° F. The unvaporized liquid comprises furfural and a small amount of polymer liquid higher boiling than the furfural, and ranging in amount from a fraction of a per cent to 1 or 2 per cent by weight of the liquid.

This liquid mixture of furfural containing polymer in relatively small proportion is separately subjected to distillation in the absence of steam to remove the bulk of the furfural in substantially dry form, leaving a residual fraction comprising furfural and polymer in which the polymer amounts to 10 to 15% by volume, more or less. Thus, it may contain as much as 50% polymer.

This residual fraction is then subjected to steam stripping to strip furfural from the polymer liquid. This steam distillation is carried out at temperatures in the range about 200 to 350° F. and usually at temperatures of about 280 to 340° F.

Accordingly, the invention is primarily concerned with effecting the steam distillation of this residual fraction or polymer concentrate in the presence of a surface-active agent so that accumulation of the polymer material upon the interior metal surfaces of the iron and steel apparatus used in this distillation step is prevented. The agent in question is one which reduces the surface tension of water and reduces the interfacial tension between polymer and water and between the metal surfaces and water.

In actual plant operation, the proportion of this polymer concentrate to the total furfural employed in the system may be relatively small. Therefore, only a portion of the recovered solvent may be subjected to the foregoing steam stripping step. Thus, one or two per cent of the total furfural in the system may be continuously withdrawn from the recovery system in the form of polymer concentrate, and this withdrawn concentrate subjected to steam stripping in the presence of the surface-active agent. The furfural recovered from this steam stripping is continuously returned to the system. In this way, the accumulation of polymer material in the solvent is prevented from exceeding a predetermined limit.

An effective method of carrying out the steam stripping or distillation of the withdrawn polymer concentrate in the presence of the surface-active agent is illustrated in the accompanying drawing, to which reference will now be made.

Referring to the drawing, the numeral 1 designates a unit wherein furfural or a solvent comprising furfural is used to effect extraction or extractive distillation of butadiene, for example, from a dehydrogenated $C_4$ hydrocarbon mixture. The resulting extract phase is conducted from the unit 1 through a pipe 2 to a fractionator 3 wherein the extract hydrocarbons are fractionated from the solvent. The hydrocarbons are discharged through a pipe 4, while the unvaporized fraction comprising furfural, containing a small amount of hydrocarbon material amounting from about 1 to 2% by volume, is drawn off through a pipe 5.

The withdrawn furfural stream is conducted to a fractionator 6 wherein the major portion of the solvent is removed as a distillate through a pipe 7.

Residual liquid comprising a mixture of furfural and polymer, which latter may amount to about 10 to 15% by volume, is drawn off through a pipe 8.

The fractionators 3 and 6 may be provided with suitable reboilers, not indicated, with which to supply the heat necessary for effecting their operation. The fractionation in the fractionator 6 is carried out without the addition of steam so as to remove a distillate containing dry or substantially dry furfural.

The residual liquid or polymer concentrate drawn off from the pipe 8 may be passed all or in part to a steam stripper 9. The portion not passed to the steam stripper 9 may be discharged from the system or may be recycled to a solvent storage tank, not shown, from which solvent is drawn for use in the extraction unit 1.

The stripper 9 may comprise a tower packed with baffles or with other suitable packing means such as Raschig rings, bubble trays, etc.

The polymer concentrate is introduced to an intermediate section of the column, while steam at a temperature of about 390° F., for example, is introduced to the bottom section of the column through a pipe 10.

A stream of water is introduced to the top section of the column through a pipe 11, and provides a reflux medium for the column. This water contains a small amount of surface-active agent, such as sodium naphthenate, amounting to from about 0.1 to 1% by weight of the water.

This aqueous solution, at a temperature of about 100 to 150° F., is introduced through the pipe 11 in an amount ranging from about ¾ to 3 or 4 volumes of solution per volume of polymer concentrate entering the column 9.

Steam is introduced at sufficiently elevated temperature and in sufficient amount to distil from the column a constant boiling mixture of water and furfural containing about 65% water and boiling at about 208° F. This distillate is discharged through a pipe 12. It may be subjected to a further fractionating treatment so as to effect further separation of water from the furfural. The amount of water removed at this stage is advantageously adjusted so that the water content of the furfural used in the extraction unit 1 is maintained at about 4% by volume. Furfural containing this small amount of water provides an effective solvent for the extractive distillation of the previously-mentioned $C_4$ hydrocarbon mixture.

The residual liquid accumulating in the stripping column 9 comprises polymer liquid suspended in water and it is drawn off through a pipe 13.

The residual liquid comprising a suspension of polymer in water is continuously drawn off from the bottom of the tower through a pipe 7.

The stripping column 2, when operating in the above manner, remains clean during continued operation for prolonged periods of time, which is to be contrasted with operations carried out in the absence of the detergent material. In this latter case the column becomes rapidly clogged with sticky and gummy material.

While mention has been made of the treatment of furfural-polymer mixtures produced in the solvent extraction or in the extractive distillation of mixtures containing butadiene, nevertheless it is contemplated that the invention has application to furfural-polymer mixtures derived from other sources. In other words, the invention has to do with the distillation of furfural from mixtures containing it in association with relatively large concentrations of a polymer material which tends to adhere to the metal surfaces of the distillation or stripping apparatus.

It is also contemplated that it has application with respect to other solvents of the Furan type, such as furfuryl alcohol and tetrahydrofurfuryl alcohol. Accordingly, the term furfural in the appended claims is used in a comprehensive sense to include furfural and its related compounds.

Surface-active agents other than those already mentioned may be used. They may comprise wetting agents, detergents, demulsifiers, soaps, etc., examples of which include alkali metal salts of sulfonic acids; sodium soap of tall oil; alkali metal salts of acid sulfuric esters of high molecular weight alcohols, such as lauryl sodium sulfate; alkyl esters of sodium sulfosuccinic acid, such as the dihexyl ester, the diamyl ester or the dibutyl ester of sodium sulfosuccinic acid; and alkyl aryl sulfonates, etc. Compounds offered to the trade, such as Nacconol NR (alkayl aryl sulfonate), Aerosol MA (dihexyl ester of sodium sulfo-succinic acid), Aerosol AY (di amyl ester of sodium sulfo-succinic acid), Aerosol IB (di isobutyl ester of sodium sulfo-succinic acid), Aerosol OS (isopropyl naphthalene sodium sulfonate) and fatty alcohol sulfates such as Dreft and Drene, may be used.

Obviously many modifications and variations of the invention as above set forth may be made without departing from the spirit and scope thereof, and therefore only such limitations should be imposed as are indicated in the appended claims.

We claim:

1. The continuous method of recovering furfural from a mixture of furfural and polymer which comprises passing to an intermediate portion of a distilling column a stream of furfural feed containing a substantial amount of polymer liquid formed during contact between furfural and $C_4$ olefinic hydrocarbons at elevated temperatures, said polymer being higher boiling than furfural, passing to the upper portion of said tower as reflux liquid a stream of water containing a small amount of a water soluble alkali metal salt wetting agent, passing steam to the lower portion of said column at an elevated temperature and in an amount sufficient to distil furfural from said feed, removing from the top of said tower a distillate stream consisting essentially of furfural and steam, and removing from the bottom of said column a stream of polymer liquid suspended in water.

2. The method of recovering furfural from a mixture of furfural and polymer which comprises passing to a distilling zone a furfural feed containing a substantial amount of polymer formed by contact between furfural containing a small amount of water and $C_4$ olefins at a temperature in the range of about 140 to 340° F., said polymer being higher boiling than furfural, and distilling furfural from said feed in the distilling zone with the aid of steam in the presence of liquid water containing a small amount of sodium naphthenate sufficient to prevent substantial accumulation of said polymer upon the interior surfaces of the distilling zone, and withdrawing the polymer from the distilling zone in a water suspension.

3. The continuous method of recovering furfural from a mixture of furfural and polymer which comprises passing to an intermediate portion of a distilling column a stream of furfural feed containing a substantial amount of polymer liquid formed by contact between furfural and $C_4$ olefinic hydrocarbons at a temperature in the range of about 140 to 340° F., said polymer being higher boiling than furfural, passing to the upper portion of said tower as reflux liquid a stream of water containing about 0.1 to 1% by weight of a water soluble alkali metal salt wetting agent, passing steam to the lower portion of said column at an elevated temperature and in an amount sufficient to distill furfural from said feed, removing from the top of said tower a distillate stream consisting essentially of furfural and steam, and removing from the bottom of said column a stream of polymer liquid suspended in water.

4. The continuous method of recovering furfural from a mixture of furfural and polymer which comprises passing to an intermediate portion of a distilling column a stream of furfural feed containing a substantial amount of polymer liquid formed by contact between furfural and $C_4$ olefinic hydrocarbons at a temperature in the range of about 140 to 340° F., said polymer being higher-boiling than furfural, passing to the upper portion of said tower as reflux liquid a stream of water containing about 0.1 to 1% by weight of sodium naphthenate, passing steam to the lower portion of said column at an elevated temperature and in an amount sufficient to distill furfural from said feed, removing from the top of said tower a distillate stream consisting essentially of furfural and steam and removing from the bottom of said column a stream of polymer liquid containing water.

CHARLES T. ANNÉ.
ROY F. NELSON.

REFERENCES CITED

The following references are of record in the file of this patent:

UNITED STATES PATENTS

| Number | Name | Date |
| --- | --- | --- |
| 1,950,429 | Calcott et al. | Mar. 13, 1934 |
| 2,004,160 | Downing et al. | June 11, 1935 |
| 2,350,584 | Buell et al. | June 6, 1944 |
| 2,350,609 | Hachmuth | June 6, 1944 |
| 2,388,041 | Craig | Oct. 30, 1945 |
| 2,388,834 | Douslin et al. | Nov. 13, 1945 |
| 2,404,253 | Scarth | July 16, 1946 |
| 2,428,120 | Miller | Sept. 30, 1947 |
| 2,446,159 | Mottern et al. | July 27, 1948 |